（12) United States Patent
Bao (10) Patent No.: US 10,331,164 B2
(45) Date of Patent: Jun. 25, 2019

(54) DISPLAY SCREEN ASSEMBLY, ELECTRONIC DEVICE AND IMAGE ACQUISITION METHOD (71) Applicant: GUANGDONG OPPO MOBILE TELECOMMUNICATIONS CORP., LTD., Dongguan, Guangdong (CN)

(72) Inventor: Xiaoming Bao, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/828,791

(22) Filed: Dec. 1, 2017

(65) Prior Publication Data

US 2018/0210493 A1 Jul. 26, 2018

(30) Foreign Application Priority Data

Jan. 26, 2017 (CN) .......................... 2017 1 0057604

(51) Int. Cl.
G06F 1/16 (2006.01)
G06F 3/041 (2006.01)
H04N 5/225 (2006.01)

(52) U.S. Cl.
CPC .......... *G06F 1/1605* (2013.01); *G06F 1/1607* (2013.01); *G06F 1/1643* (2013.01);
(Continued)

(58) Field of Classification Search
CPC .............................. G06F 1/1605; G06F 1/1626
(Continued)

(56) References Cited

U.S. PATENT DOCUMENTS 8,022,977 B2 9/2011 Kanade
8,345,129 B2 1/2013 Kanade
(Continued)

FOREIGN PATENT DOCUMENTS

CN 102411878 A 4/2012
CN 102662302 A 9/2012
(Continued)

OTHER PUBLICATIONS

International Search Report (ISR) and Written Opinion (WO) dated Jan. 26, 2018 for International Application No. PCT/CN2017/110706.
(Continued)

*Primary Examiner* — Anthony Q Edwards
(74) *Attorney, Agent, or Firm* — Ladas & Parry LLP (57) ABSTRACT A display screen assembly, an electronic device and an image acquisition method are provided. The electronic device includes a housing, a display screen assembly, a camera and a processor. The display screen assembly is arranged on the housing. The display screen assembly and the housing cooperatively define a receiving chamber. The display screen assembly includes a transparent entity area. The transparent entity area includes a plurality of image pixels configured to display data information. The camera is arranged in the receiving chamber. The camera corresponds to the transparent entity area and is configured to receive light passing through the transparent entity area to acquire an initial image including a first scene outside the electronic device and a second scene inside the electronic device. The processor is configured to process the initial image to obtain a target image that includes the first scene and is without the second scene.

20 Claims, 5 Drawing Sheets (52) U.S. Cl.
CPC .......... *G06F 1/1686* (2013.01); *G06F 3/0412* (2013.01); *H04N 5/2253* (2013.01)

(58) Field of Classification Search
USPC ................................................ 361/767, 776
See application file for complete search history.

(56) References Cited

U.S. PATENT DOCUMENTS

| | | | |
|---|---|---|---|
| 8,913,170 B1* | 12/2014 | Baldwin | G06F 1/1686 |
| | | | 348/333.01 |
| 9,013,613 B2* | 4/2015 | Ogita | H04M 1/0264 |
| | | | 348/294 |
| 9,143,668 B2* | 9/2015 | Mathew | H04N 5/2251 |
| 9,692,986 B2 | 6/2017 | Zhang | |
| 2007/0120879 A1 | 5/2007 | Kanade | |
| 2007/0153119 A1* | 7/2007 | Bilbrey | G06F 1/1605 |
| | | | 348/373 |
| 2009/0009628 A1 | 1/2009 | Janicek | |
| 2011/0103644 A1 | 5/2011 | Garten | |
| 2011/0279689 A1 | 11/2011 | Maglaque | |
| 2011/0292255 A1 | 12/2011 | Kanade | |
| 2012/0069042 A1 | 3/2012 | Ogita | |
| 2012/0105400 A1* | 5/2012 | Mathew | H04N 5/2251 |
| | | | 345/207 |
| 2012/0262569 A1 | 10/2012 | Cudak et al. | |
| 2012/0262572 A1 | 10/2012 | Cudak | |
| 2013/0033581 A1* | 2/2013 | Woo | H04N 5/2257 |
| | | | 348/47 |
| 2013/0088630 A1 | 4/2013 | Kanade et al. | |
| 2013/0177302 A1* | 7/2013 | Weber | G06F 1/1626 |
| | | | 396/155 |
| 2015/0199029 A1* | 7/2015 | Kim | G06F 3/0238 |
| | | | 345/169 |
| 2015/0293661 A1* | 10/2015 | Gomez | G06F 3/0488 |
| | | | 345/173 |
| 2017/0006143 A1* | 1/2017 | Yang | H04M 1/0249 |
| 2017/0034445 A1 | 2/2017 | Jing et al. | |
| 2017/0142342 A1 | 5/2017 | Zhang | |
| 2017/0287992 A1* | 10/2017 | Kwak | G06F 3/041 |

FOREIGN PATENT DOCUMENTS

| | | |
|---|---|---|
| CN | 202587173 U | 12/2012 |
| CN | 103530072 A | 1/2014 |
| CN | 103780812 A | 5/2014 |
| CN | 203812541 U | 9/2014 |
| CN | 104539833 A | 4/2015 |
| CN | 205754629 U | 11/2016 |
| CN | 106603772 A | 4/2017 |
| EP | 2432196 A1 | 3/2012 |
| JP | 2005-130001 A | 5/2005 |
| WO | 2011/053374 A1 | 5/2011 |

OTHER PUBLICATIONS

European Search Report No. EP 17201859.0-1208 dated Feb. 5, 2018.
Espacenet English abstract of CN 106603772 A.
Espacenet English abstract of CN 102411878 A.
Espacenet English abstract of CN 205754629 U.
Espacenet English abstract of CN 103780812 A.
Espacenet English abstract of CN 104539833 A.
Espacenet English abstract of CN 202587173 U.
Espacenet English abstract of JP 2005-130001 A.
Christian Simon etal: "Reflection 1-14 removal for in-vehicle black box videos", 2815 IEEE Conference on Computer Vision and Pattern Recognition (CVPR), IEEE, Jun. 7, 2015 (2015-86-07), pp. 4231-4239, XP032793877, DOI: 10.1189./CVPR.2815.7299851.

* cited by examiner

DISPLAY SCREEN ASSEMBLY, ELECTRONIC DEVICE AND IMAGE ACQUISITION METHOD

CROSS REFERENCE TO RELATED APPLICATIONS

This application claims priority to Chinese patent application No. 201710057604.3 titled "ELECTRONIC DEVICE AND IMAGE ACQUISITION METHOD", and filed on Jan. 26, 2017, the disclosures for which are hereby incorporated herein in their entireties by reference.

TECHNICAL FIELD

The present disclosure relates to the technical field of consumer electronics, and more particularly, to a display screen assembly, an electronic device and an image acquisition method.

BACKGROUND

With the development of science and technology, the smart phone has become more and more popular, and the function of the smart phone is also increased, so the smart phone has become a necessary electronic device in the daily life. At present, the smart phone has a relatively low screen-to-body ratio, which leads to a poor user experience.

SUMMARY

The present disclosure provides a display screen assembly an electronic device and an image acquisition method.

According to one aspect of the disclosure, a display screen assembly is provided. The display screen assembly is applied to an electronic device. The electronic device includes a housing and a camera. The display screen assembly is arranged on the housing to define a receiving chamber cooperatively with the housing. The camera is arranged in the receiving chamber. The display screen assembly includes a transparent entity area, including a plurality of image pixels configured to display data information, the transparent entity area being positioned to a location corresponding to a location of the camera in the receiving chamber; and a non-transparent area, including a plurality of image pixels configured to display data information, and surrounding the transparent entity area, wherein the camera is adapted to receive light passing through the transparent entity area to acquire an initial image including a first scene outside the electronic device and a second scene inside the electronic device.

According to an additional aspect of the disclosure, an electronic device is provided. The electronic device includes: a housing; a display screen assembly, arranged on the housing, wherein the display screen assembly and the housing cooperatively define a receiving chamber, the display screen assembly includes a transparent entity area, and the transparent entity area includes a plurality of image pixels configured to display data information; a camera, arranged in the receiving chamber, wherein the camera corresponds to the transparent entity area and receives the light passing through the transparent entity area to acquire an initial image including a first scene outside the electronic device and a second scene inside the electronic device; and a processor, configured to process the initial image to obtain a target image that includes the first scene outside the electronic device and is without the second scene.

According to a further aspect of the disclosure, an image acquisition method used for an electronic device to acquire an image is also provided. The electronic device includes a display screen assembly. The display screen assembly includes a transparent entity area. The transparent entity area includes a plurality of image pixels configured to display data information. The image acquisition method includes the following steps: acquiring an initial image including a first scene outside the electronic device and a second scene inside the electronic device; and processing the initial image to obtain a target image that includes the first scene outside the electronic device and is without the second scene.

BRIEF DESCRIPTION OF THE DRAWINGS

The above and/or additional aspects and advantages of the embodiments of the disclosure will be apparent from the following detailed description when taken in conjunction with the accompanying drawings, wherein.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it should be understood that, the terms such as "central", "longitudinal", "lateral", "width", "thickness", "above", "below", "front", "rear", "right", "left", "vertical", "horizontal", "top", "bottom", "inner", "outer", "clockwise", and "counter-clockwise" should be construed to refer to the orientation as then described or as shown in the drawings. These terms are merely for convenience and concision of description and do not alone indicate or imply that the device or element referred to must have a particular orientation. Thus, it cannot be understood to limit the present disclosure. In addition, terms such as "first" and "second" are used herein for purposes of description and are not intended to indicate or imply relative importance or significance or impliedly indicate quantity of the technical feature referred to. Thus, the feature defined with "first" and "second" may include one or more of the features. In the description of the present disclosure, the term of "a plurality of" means two or more than two, unless specified otherwise.

In the description of the present disclosure, it should be understood that, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Figure 1:
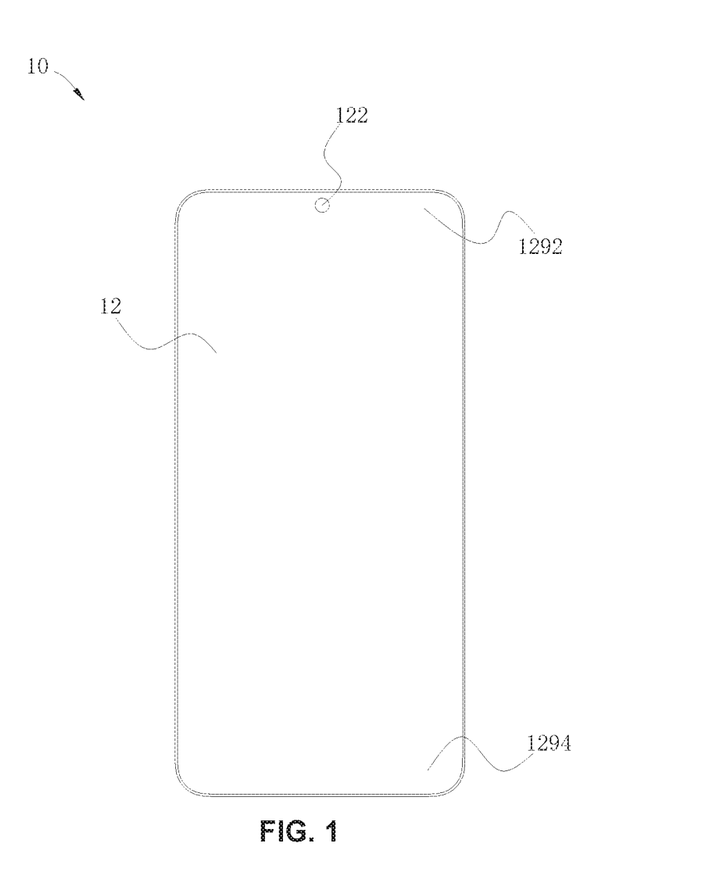
FIG. 1 is a plan schematic diagram illustrating an electronic device according to one embodiment of the present disclosure.
Figure 2:
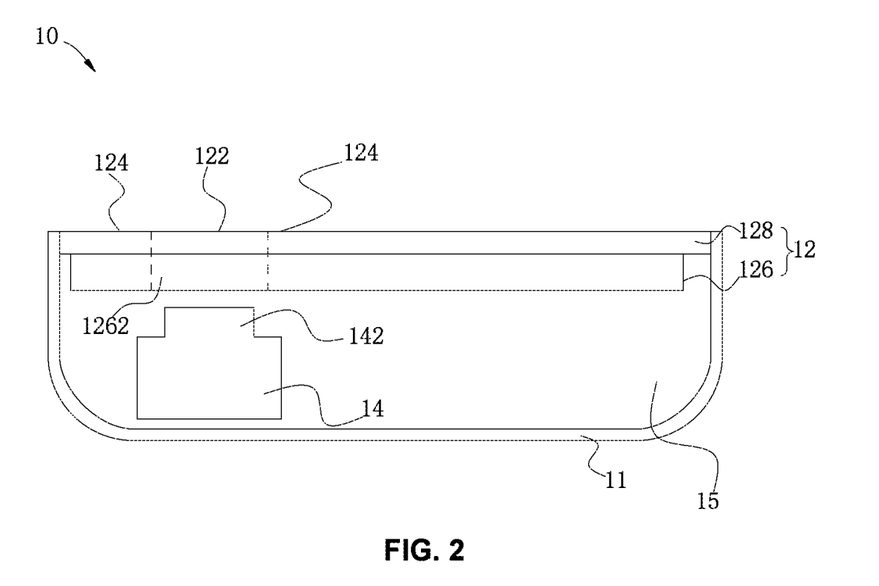
FIG. 2 is a structural schematic diagram illustrating a part of the electronic device according to one embodiment of the present disclosure.
Figure 3:
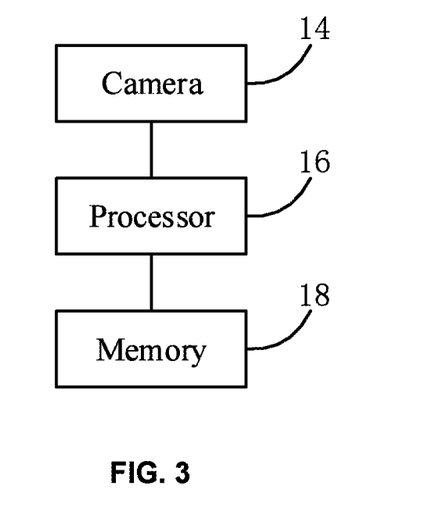
FIG. 3 is a schematic diagram illustrating function modules of the electronic device according to one embodiment of the present disclosure.

Referring to FIGS. 1 to 3, an electronic device 10 is provided. The electronic device 10 may be, but not limited to a mobile phone, a tablet computer, a smart watch, a smart bracelet, smart glasses or a smart helmet. In this embodiment, a mobile phone is taken as an example of the electronic device 10 to illustrate. Specifically, the electronic device 10 may include a housing 11, a display screen assembly 12, a camera 14, a processor 16 and a memory 18.

The display screen assembly 12 may be arranged on the housing 11. In this embodiment, the housing 11 may be a shell of the mobile phone. The display screen assembly 12 and the housing 11 may cooperatively define a receiving chamber 15. The display screen assembly 12 may include a transparent entity area 122 and a non-transparent area 124. The transparent entity area 122 may be surrounded by the non-transparent area 124. The transparent entity area may have a light transmittance greater than or equal to 50%. Both the transparent entity area 122 and the non-transparent area 124 may include image pixels configured to display data information. That is, the transparent entity area 122 may still display images normally. A projection of a center point of the transparent entity area 122 in a direction perpendicular to the display screen assembly 12 may be overlapped with a projection of a center point of the camera 14 in a direction perpendicular to the display screen assembly 12. Specifically, the projection of the transparent entity area 122 in a direction perpendicular to the display screen assembly 12 may cover the projection of the lens 142 of the camera 14 in a direction perpendicular to the display screen assembly 12. In this way, light may pass through the transparent entity area 122 to the camera 14. Both the transparent entity area 122 and the non-transparent area 124 surrounded the transparent entity area 122 are in the same thickness and continuous. The transparent entity area 122 may be arranged on an upper end 1292 of the display screen assembly 12 or a lower end 1294 of the display screen assembly 12. In this embodiment, the transparent entity area 122 may be arranged on the upper end 1292 of the display screen assembly 12.

Referring to FIG. 2, the display screen assembly 12 may include a display screen 126 and a cover 128 arranged on the display screen 126. The cover 128 may be fixed with the display screen 126 in a form of full lamination or frame attachment. Specifically, the cover 128 and the display screen 126 may be bonded by an optically clear adhesive (OCA). The display screen 126 may be an OLED (Organic Light-Emitting Diode) display screen 126, a flexible OLED display screen 126 or an AMOLED (Active-matrix organic light emitting diode) display screen 126. In this embodiment, the display screen 126 may be an OLED display screen 126. Of course, the display screen 126 may be not limited to the above types, and an appropriate display screen 126 may be selected according to the actual requirement in practice. A small area of the transparent area 1262 may be designed in the display screen 126 when designing the display screen 126. The transparent area 1262 and a portion of the cover 128 corresponding to the transparent area 1262 form the transparent entity area 122 in this embodiment together. Both upper and lower surfaces of the display screen 126 may be still flat surfaces. The transparent area of the cover 128 covers the whole display screen 126. It will be appreciated that both upper and lower surfaces of the cover 128 may be still flat surfaces, that is, both the display screen 126 and the cover 128 of the display screen assembly 12 in this embodiment may be not provided with any opening to let light pass through. A small area of the transparent area 1262 adapted to form the transparent entity area 122 may be designed when producing the display screen 126, and at this time the transparent area 1262 may still display images normally. In one example, the cover 128 may be a touch screen cover 128, that is, the touch control circuit of the touch screen may be integrated into the cover 128, so that the touch control function can be achieved by clicking on the cover 128. In some embodiments, the cover 128 may include a two-layer structure having a touch-control panel and a protective cover 128 arranged on the touch-control panel. The touch-control panel may be configured to realize the touch operation of the display screen assembly 12. The protective cover 128 may be configured to prevent the touch-control panel from being damaged by touching the touch-control panel directly. The cover 128 may be made of glass, sapphire, polyvinyl chloride (PVC) or other materials. Of course, the material of the cover 128 may be not limited to the above types, and an appropriate material of the cover 128 may be selected according to the actual requirement in practice.

The camera 14 may be arranged in the receiving chamber 15. The camera 14 may correspond to the transparent entity area 122 and receive the light passing through the transparent entity area 122 to acquire an initial image including a first scene outside the electronic device 10 and a second scene inside the electronic device 10. Since the projection of the transparent entity area 122 in the vertical direction covers the lens 142 of the camera 14, so that the camera 14 may capture more light to enhance the capturing effect.

Referring to FIG. 3, the processor 16 may be configured to process the initial image to acquire a target image that includes the first scene outside the electronic device 10 and is without the second scene. Further, the target image may only include the first scene. The processor 16 may be configured to acquire in real time an image displayed on the transparent entity area 122 when the plurality of image pixels of the transparent entity area are displaying the data information. The memory 18 may be configured to store a pre-stored image captured for the transparent entity area 122 when there is no data information displayed on the plurality of image pixels of the transparent entity area 122. The second scene may include a first sub-scene corresponding to the displayed image and a second sub-scene corresponding to the pre-stored image. The processor 16 may be configured to remove the first sub-scene and the second sub-scene from the initial image to obtain the target image that includes the first scene and is without the second scene, based on the initial image, the displayed image and the pre-stored image. It will be appreciated that since the transparent area 1262 of the display screen 126 may still display the image, components for displaying may be arranged on the transparent area 1262. The memory 18 may store the image of the components arranged on the transparent area 1262 as the pre-stored image in advance. When a user capture an image with the camera during normal use of the display screen 126, the image pixels displayed on the display screen 126 may be also captured into the initial image. The processor 16 may acquire in real time the image pixels displayed on the transparent entity area 122, and process the initial image to remove the image of the components arranged on the transparent area 1262 of the display screen 126 and the image displayed on the transparent entity area 122, to obtain the target image.

For the electronic device 10 in this embodiment of the present disclosure, when manufacturing the display screen 126 of the display screen assembly 12, a small area of the transparent area 1262 may be reserved on a corresponding position of the camera 14 to form a part of the transparent entity area 122. Since the cover 128 arranged directly above the transparent area is transparent, the light can enter the lens 142 of the camera 14 through the transparent entity area 122. In this way, the camera 14 can receive the external light outside the electronic device 10 without opening a hole through the display screen assembly 12. Since the display screen assembly 12 can still display normally when the camera 14 is acquiring the image, the transparent entity area 122 may include the components for displaying. The initial image acquired by the camera 14 may include the image pixels of the components for displaying and the image pixels displayed on the transparent entity area 122. The processor 16 may remove the image pixels of the components for displaying and the image pixels displayed on the transparent entity area 122 to obtain a target image that includes the first scene outside the electronic device 10 and is without the second scene.

For the electronic device 10 in this embodiment of the present disclosure, the camera 14 may acquire the image outside the electronic device through the transparent entity area 122 on the display screen assembly 12. There is no band required to be broad enough for mounting an optical device reserved at upper and lower sides of a display surface of the electronic device 10, so as to realize narrow borders around the display surface, expand a screen-to-body ratio of the electronic device 10, and improve the user experience.

Further, for the electronic device 10 in this embodiment of the present disclosure, a transparent entity area 122 may be reserved on the display screen assembly 12, to avoid opening a hole through the display screen assembly 12. The apparent aesthetic sense of the electronic device 10 is improved.

Further, compared to the way in which the display screen assembly 12 is provided with a hole through which the light pass into the camera, a small area of the transparent area 1262 is designed in the display area of the display screen 126 when designing the display screen 126 in this embodiment, without affecting the display function of the display screen assembly 12. Since the transparent entity area 122 of the display screen assembly 12 may display normally and still include image pixels, the processor 16 may process the initial image to obtain a target image that includes the first scene outside the electronic device and is without the second scene. That is, the electronic device provided in this embodiment of the present disclosure can expand the screen-to-body ratio and improve the user experience while the user uses the electronic device 10 normally.

Referring to FIG. 3, in this embodiment, the memory 18 may be configured to store the pre-stored image captured for the transparent entity area 122 when there is no data information displayed on the plurality of image pixels of the transparent entity area 122. The second scene may correspond to the pre-stored image. The processor 16 may be configured to remove the second scene from the initial image to obtain the target image that includes the first scene and is without the second scene, based on the initial image and the pre-stored image.

In this way, the user can take an image when the screen is off. For example, when the electronic device 10 is a mobile phone, a shortcut button for photographing may be provided, so that when the screen is off, the user can press the shortcut key to take an image, and the user can switch off the screen during photographing process to reduce the power consumption when the mobile phone has a relatively low battery.

Figure 4:
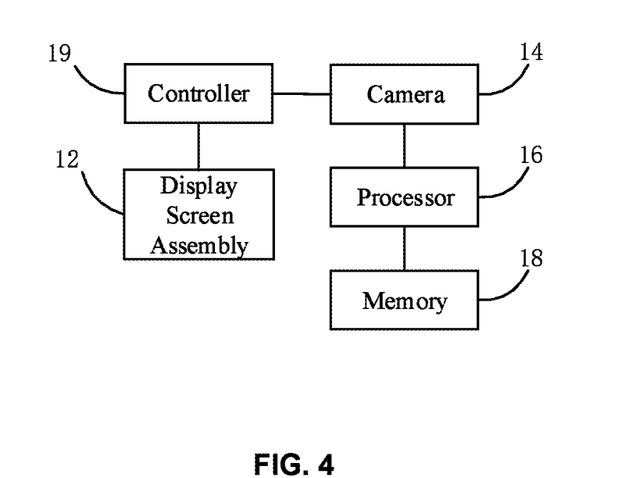
FIG. 4 is a schematic diagram illustrating function modules of the electronic device according to one embodiment of the present disclosure.

Referring to FIG. 4, in this embodiment, the electronic device 10 may further include a controller 19. The controller 19 may be configured to control a color displayed on the plurality of image pixels of the transparent entity area 122 to cause the transparent entity 122 area to act as a filter, when the camera 14 is capturing the initial image. In one example, when the user wants to get a certain photographing effect, the color displayed on the display screen assembly 12 may be controlled by the controller 19 to cause the transparent entity area 122 to act as a simulating filter. In this way, the color of the initial image may be adjusted to obtain a target image with an ideal effect, to reduce the post-processing of the image and improve the user experience. Specifically, when the electronic device 10 is a mobile phone, the controller 19 may be a central processing unit (CPU) of the mobile phone. An algorithm may be designed to achieve that the color displayed on the plurality of image pixels of the transparent entity area 122 is controlled when the camera 14 is capturing the initial image.

In addition, the controller 19 may be further configured to control the transparent entity area 122 to give out white light to cause the transparent entity area 122 to act as a flashlight, when the camera 14 is acquiring the initial image. In one example, when the user needs to take an image in a dark environment, the display screen assembly 12 may be controlled by the controller 19 to display the white light, so that the transparent entity area 122 acts as or a simulates a flashlight, to improve the brightness when capturing the initial image. In this way, a target image with an ideal effect may be captured, to reduce the post-processing of the image, and improve the user experience. Further, the flashlight may be omitted, so that the manufacturing cost of the electronic device 10 may be reduced, the mounting space may be reduced, the volume of the electronic device 10 may be reduced, the weight of the electronic device 10 may be reduced, and the user experience may be improved.

Figure 5:
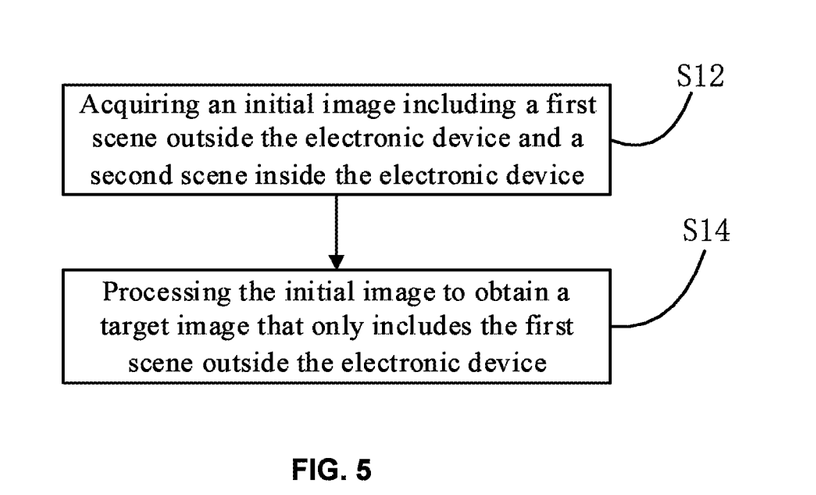
FIG. 5 is a flow diagram illustrating an image acquisition method according to one embodiment s of the present disclosure.

Referring to FIG. 5, an image acquisition method used for the above electronic device 10 to acquire an image is provided. The electronic device 10 may include a display screen assembly 12. The display screen assembly 12 may include a transparent entity area 122. The transparent entity area 122 may include a plurality of image pixels configured to display the data information. First, an initial image including a first scene outside the electronic device 10 and a second scene inside the electronic device 10 may be acquired (S12). Then the initial image may be processed to obtain a target image that includes the first scene outside the electronic device and is without the second scene (S14).

Specifically, the camera 14 of the electronic device 10 in the above embodiments may be used to acquire the initial image including the first scene outside the electronic device 10 and the second scene inside the electronic device 10. The processor 16 of the electronic device 10 in the above embodiments may be used to process the initial image to obtain a target image that includes the first scene outside the electronic device and is without the second scene.

In this way, the camera 14 may acquire the image outside the electronic device through the transparent entity area 122 on the display screen assembly 12. There is no band required to be broad enough for mounting an optical device reserved at upper and lower sides of a display surface of the electronic device 10, so as to realize narrow borders around the display surface, expand a screen-to-body ratio of the electronic device 10, and improve the user experience.

Further, the processor 16 may process the initial image to obtain a target image that includes the first scene outside the electronic device 10 and is without the second scene. That is, the image acquisition method provided in this embodiment of the present disclosure can expand the screen-to-body ratio and improve the user experience while the user uses the electronic device 10 normally.

Figure 6:
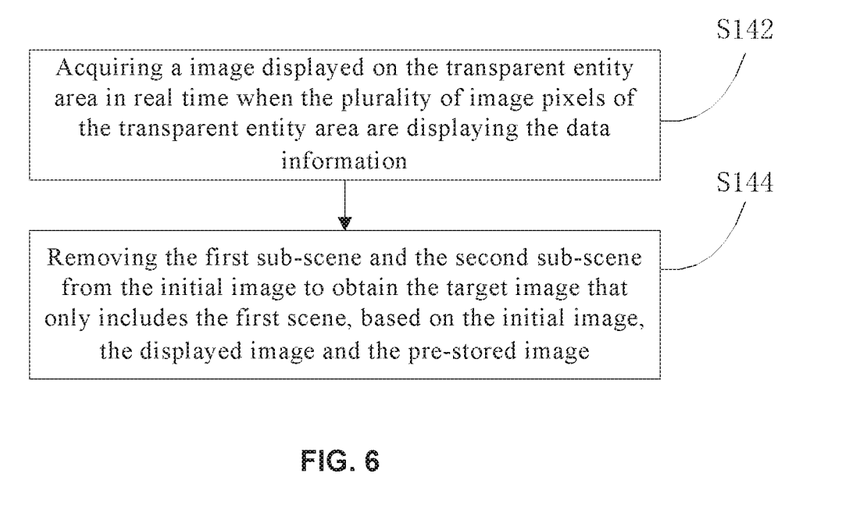
FIG. 6 is a flow diagram illustrating an image acquisition method according to one embodiment of the present disclosure.

Referring to FIG. 6, in this embodiment, the electronic device 10 may further include a memory 18. The memory 18 may be configured to store a pre-stored image captured for the transparent entity area 122 when there is no data information displayed on the plurality of image pixels of the transparent entity area 122.

In this embodiment, an image displayed on the transparent entity area 122 when the plurality of image pixels of the transparent entity area are displaying the data information may be acquired in real time (S142). The second scene includes a first sub-scene corresponding to the displayed image and a second sub-scene corresponding to the pre-stored image. The first sub-scene and the second sub-scene may be removed from the initial image to obtain the target image that includes the first scene and is without the second scene, based on the initial image, the displayed image and the pre-stored image (S144).

The display screen assembly 12 may include a display screen 126 configured to display the image pixels. The transparent area is arranged on the display screen 126 to form a part of the transparent entity area 122. It will be appreciated that since the transparent area 1262 of the display screen 126 may still display the image, the transparent area 1262 may include components for displaying. The memory 18 may store the image of the components arranged on the transparent area 1262 as the pre-stored image in advance. When a user capture an image with the camera during normal use of the display screen 126, the image pixels displayed on the display screen 126 may be also captured into the initial image. The processor 16 may acquire in real time the image pixels displayed on the transparent entity area 122, and process the initial image to remove the image of the components arranged on the transparent area 1262 of the display screen 126 and the image displayed on the transparent entity area 122, to obtain the target image.

Figure 7:
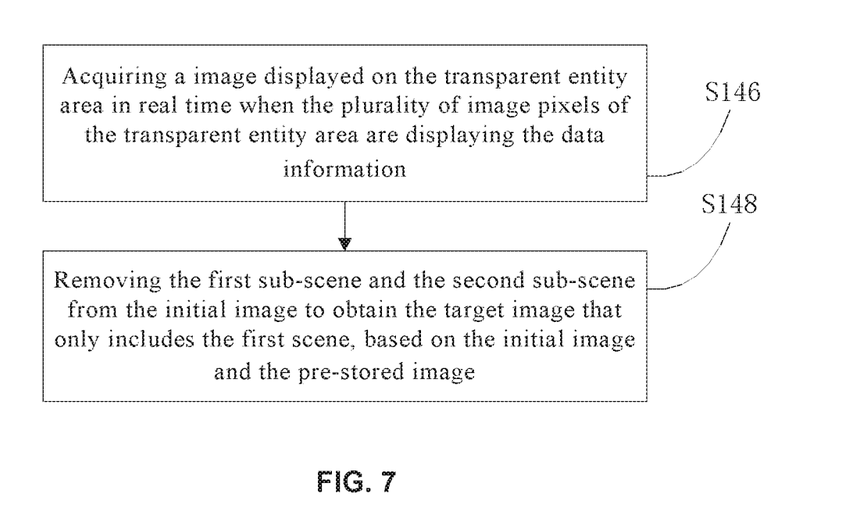
FIG. 7 is a flow diagram illustrating an image acquisition method according to one embodiment of the present disclosure.

Referring to FIG. 7, in this embodiment, the electronic device 10 may also include a memory 18 configured to store a pre-stored image captured for the transparent entity area 122 when there is no data information displayed on the plurality of image pixels of the transparent entity area 122.

In this embodiment, a pre-stored image captured for the transparent entity area 122 when there is no data information displayed on the plurality of image pixels of the transparent entity area 122 may be acquired in real time (S146). The second scene corresponds to the pre-stored image. The second scene may be removed from the initial image to obtain the target image that includes the first scene and is without the second scene, based on the initial image and the pre-stored image (S148).

In this way, the user can take an image when the screen is off. For example, when the electronic device 10 is a mobile phone, a shortcut button for photographing may be provided, so that when the screen is off, the user can press the shortcut key to take an image, and the user can switch off the screen during photographing process to reduce the power consumption when the mobile phone has a relatively low battery.

Figure 8:
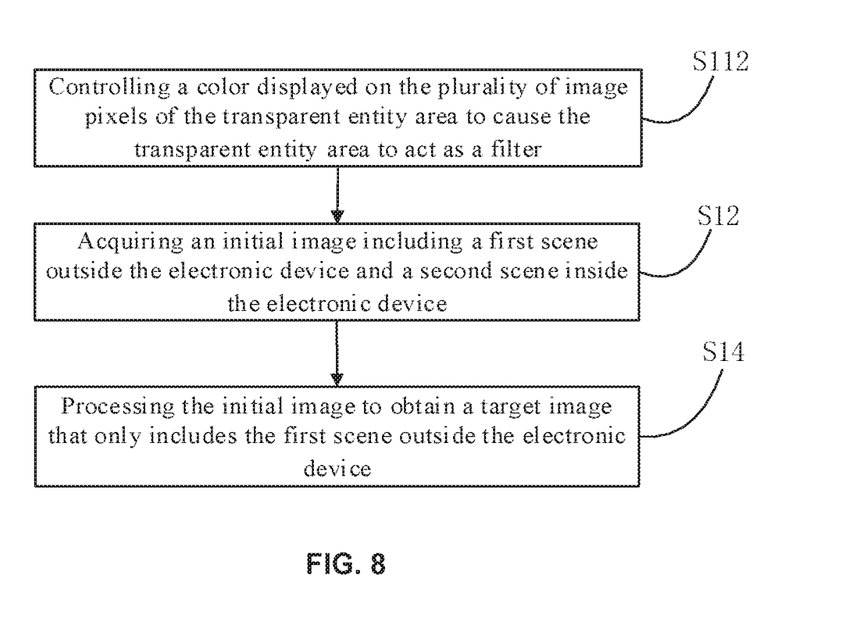
FIG. 8 is a flow diagram illustrating an image acquisition method according to one embodiment of the present disclosure.

Referring to FIG. 8, in this embodiment, the electronic device 10 may further include a controller 19. Before acquiring the initial image, a color of the plurality of image pixels of the transparent entity area 122 may be controlled to cause the transparent entity area 122 to act as a filter (S112).

When the user wants to get a certain photographing effect, the color displayed on the display screen assembly 12 may be controlled by the controller 19 to cause the transparent entity area 122 to act as a simulating filter. In this way, the color of the initial image may be adjusted to obtain a target image with an ideal effect, to reduce the post-processing of the image and improve the user experience.

Figure 9:
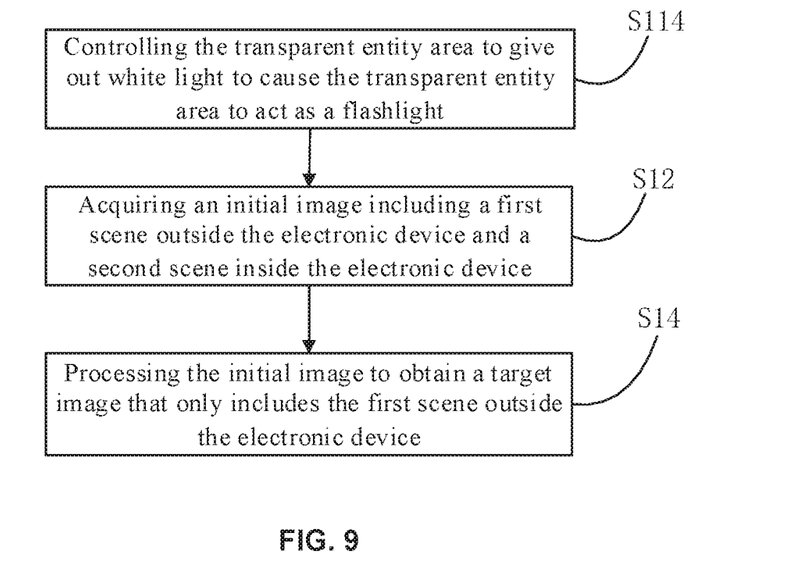
FIG. 9 is a flow diagram illustrating an image acquisition method according to one embodiment of the present disclosure.

Referring to FIG. 9, in this embodiment, before acquiring the initial image, the transparent entity area 122 may be controlled to give out white light to cause the transparent entity area 122 to act as a flashlight (S114).

When the user needs to take an image in a dark environment, the display screen assembly 12 may be controlled by the controller 19 to display the white light, so that the transparent entity area 122 acts as or a simulates a flashlight, to improve the brightness when capturing the initial image. In this way, a target image with an ideal effect may be captured, to reduce the post-processing of the image, and improve the user experience. Further, the flashlight may be omitted, so that the manufacturing cost of the electronic device 10 may be reduced, the mounting space may be reduced, the volume of the electronic device 10 may be reduced, the weight of the electronic device 10 may be reduced, and the user experience may be improved.

In the description of the present specification, the description of a reference term such as "a certain embodiment", "one embodiment", "some embodiments", "an exemplary embodiment", "an example", "a specific example" or "some examples" means that the specific features, configurations, materials, or features described in combination with the embodiments or examples are included in at least one embodiment or example of the present disclosure. In the present specification, the indicative expression of the terms mentioned above does not indicate the same embodiments or examples. Also, the features, configurations, materials or features described above may be combined in any one or more embodiments or examples in a suitable way.

In addition, terms such as "first" and "second" are used herein for purposes of description and are not intended to indicate or imply relative importance or significance or impliedly indicate quantity of the technical feature referred to. Thus, the feature defined with "first" and "second" may include at least one feature. In the description of the present disclosure, the term of "a plurality of" means at least two, for example, two or three, unless specified otherwise.

Although various embodiments of the present disclosure have been illustrated and described above, it would be appreciated by those skilled in the art that the above embodiments are exemplary and should not be deemed as limitations to the present disclosure. It should be noted that variations and improvements will become apparent to those skilled in the art to which the present disclosure pertains without departing from its scope. Therefore, the scope of the present disclosure is defined by the appended claims and their equivalents.

CLAUSES

Clause 1. An electronic device, comprising:
a housing;
a display screen assembly, arranged on the housing, wherein the display screen assembly and the housing cooperatively define a receiving chamber, the display screen assembly includes a transparent entity area, and the transparent entity area includes a plurality of image pixels configured to display data information;
a camera, arranged in the receiving chamber, wherein the camera corresponds to the transparent entity area and is configured to receive light passing through the transparent entity area to output an initial image including a first scene outside the electronic device and a second scene inside the electronic device; and
a processor, configured to process the initial image to obtain a target image that only includes the first scene outside the electronic device.

Clause 2. The electronic device according to claim 1, wherein the processor is configured to acquire in real time an image displayed on the transparent entity area when the plurality of image pixels of the transparent entity area are displaying the data information, the electronic device further includes a memory configured to store a pre-stored image captured for the transparent entity area when there is no data information displayed on the plurality of image pixels of the transparent entity area, the second scene includes a first sub-scene corresponding to the displayed image and a second sub-scene corresponding to the pre-stored image, and the processor is configured to remove the first sub-scene and the second sub-scene from the initial image to obtain the target image that only includes the first scene, based on the initial image, the displayed image and the pre-stored image.

Clause 3. The electronic device of claim 1, further comprising:
a memory, configured to store a pre-stored image captured for the transparent entity area when there is no data information displayed on the plurality of image pixels of the transparent entity area, the second scene corresponds to the pre-stored image, and the processor is configured to remove the second scene from the initial image to obtain the target image that only includes the first scene, based on the initial image and the pre-stored image.

Clause 4. The electronic device of claim 3, further comprising:
a controller, configured to control a color displayed on the plurality of image pixels of the transparent entity area to cause the transparent entity area to act as a filter, when the camera is acquiring the initial image.

Clause 5. The electronic device of claim 3, further comprising:
a controller, configured to control the transparent entity area to give out white light to cause the transparent entity area to act as a flashlight, when the camera is acquiring the initial image.

Clause 6. The electronic device of claim 1, wherein a projection of a center point of the transparent entity area in a direction perpendicular to the display screen assembly is overlapped with a projection of a center point of the camera in a direction perpendicular to the display screen assembly.

Clause 7. The electronic device of claim 1, wherein a projection of the transparent entity area in a direction perpendicular to the display screen assembly covers a projection of the camera in a direction perpendicular to the display screen assembly.

Clause 8. The electronic device of claim 1, wherein the display screen assembly includes a display screen, wherein the display screen is any one of an OLED display screen, a flexible OLED display screen and an AMOLED display screen.

Clause 9. The electronic device of claim 1, the display screen assembly further includes a cover arranged on the display screen, wherein the cover is a touch screen cover.

Clause 10. A image acquisition method for an electronic device to acquire an image, the electronic device including a display screen assembly, the display screen assembly including a transparent entity area, the transparent entity area including a plurality of image pixels configured to display data information, the image acquisition method comprising:
outputting an initial image including a first scene outside the electronic device and a second scene inside the electronic device; and
processing the initial image to obtain a target image that only includes the first scene outside the electronic device.

Clause 11. The image acquisition method of claim 10, wherein the electronic device further includes a memory configured to store a pre-stored image captured for the transparent entity area when there is no data information displayed on the plurality of image pixels of the transparent entity area, and processing the initial image to obtain the target image that only includes the first scene outside the electronic device includes:

acquiring in real time an image displayed on the transparent entity area when the plurality of image pixels of the transparent entity area are displaying the data information, wherein the second scene includes a first sub-scene corresponding to the displayed image and a second sub-scene corresponding to the pre-stored image; and removing the first sub-scene and the second sub-scene from the initial image to obtain the target image that only includes the first scene, based on the initial image, the displayed image and the pre-stored image.

Clause 12. The image acquisition method of claim 10, wherein the electronic device further includes a memory configured to store a pre-stored image captured for the transparent entity area when there is no data information displayed on the plurality of image pixels of the transparent entity area, and processing the initial image to obtain the target image that only includes the first scene outside the electronic device includes:

acquiring in real time an image displayed on the transparent entity area when there is no data information displayed on the plurality of image pixels of the transparent entity area, wherein the second scene corresponds to the pre-stored image; and removing the second scene from the initial image to obtain the target image that only includes the first scene, based on the initial image and the pre-stored image.

Clause 13. The image acquisition method of claim 12, before outputting the initial image including the first scene outside the electronic device and the second scene inside the electronic device, further comprising:

controlling a color displayed on the plurality of image pixels of the transparent entity area to cause the transparent entity area to act as a filter.

Clause 14. The image acquisition method of claim 12, before the outputting the initial image including the first scene outside the electronic device and the second scene inside the electronic device, further comprising:

controlling the transparent entity area to give out white light to cause the transparent entity area to act as a flashlight.

What is claimed is:

1. An electronic device, comprising:
a housing, a display screen assembly, a camera, and a processor; wherein
the display screen assembly is arranged on the housing, wherein the display screen assembly and the housing cooperatively define a receiving chamber, the display screen assembly comprises a transparent entity area and a non-transparent area, the transparent entity area comprises a plurality of image pixels configured to display data information, and the non-transparent area comprises a plurality of image pixels configured to display data information and surrounds the transparent entity area;
the camera is arranged in the receiving chamber, wherein the camera corresponds to the transparent entity area and is configured to receive light passing through the transparent entity area to acquire an initial image comprising a first scene outside the electronic device and a second scene inside the electronic device, and transmit the acquired initial image to the processor; and
the processor is configured to process the initial image to obtain a target image that comprises the first scene outside the electronic device and is without the second scene.

2. The electronic device of claim 1, further comprising:
a memory, configured to store a pre-stored image captured for the transparent entity area when there is no data information displayed on the plurality of image pixels of the transparent entity area.

3. The electronic device of claim 2 wherein the processor is further configured to acquire in real time an image displayed on the transparent entity area when the plurality of image pixels of the transparent entity area are displaying the data information,
the second scene comprises a first sub-scene corresponding to the displayed image and a second sub-scene corresponding to the pre-stored image, and
the processor is further configured to remove the first sub-scene and the second sub-scene from the initial image to obtain the target image that comprises the first scene and is without the second scene, based on the initial image, the displayed image and the pre-stored image.

4. The electronic device of claim 2 wherein the second scene corresponds to the pre-stored image, and
the processor is further configured to remove the second scene from the initial image to obtain the target image that comprises the first scene and is without the second scene, based on the initial image and the pre-stored image.

5. The electronic device of claim 1, further comprising:
a controller, configured to control a color displayed on the plurality of image pixels of the transparent entity area to cause the transparent entity area to act as a filter, when the camera is acquiring the initial image.

6. The electronic device of claim 1, further comprising:
a controller, configured to control the transparent entity area to give out white light to cause the transparent entity area to act as a flashlight, when the camera is acquiring the initial image.

7. The electronic device of claim 1 wherein a projection of a center point of the transparent entity area in a direction perpendicular to the display screen assembly is overlapped with a projection of a center point of the camera in a direction perpendicular to the display screen assembly.

8. The electronic device of claim 1 wherein a projection of the transparent entity area in a direction perpendicular to the display screen assembly covers a projection of the camera in a direction perpendicular to the display screen assembly.

9. The electronic device of claim 1 wherein the display screen assembly comprises a display screen, wherein the display screen is any one of an OLED display screen, a flexible OLED display screen and an AMOLED display screen.

10. The electronic device of claim 9, the display screen assembly further comprises a cover arranged on the display screen, wherein the cover is a touch screen cover.

11. An image acquisition method for an electronic device to acquire an image, the electronic device comprising a display screen assembly, the display screen assembly comprising a transparent entity area and a non-transparent area, the transparent entity area comprising a plurality of image pixels configured to display data information, the non-transparent area comprising a plurality of image pixels configured to display data information and surrounding the transparent entity area, the image acquisition method comprising:

acquiring an initial image comprising a first scene outside the electronic device and a second scene inside the electronic device; and processing the initial image to obtain a target image that comprises the first scene outside the electronic device and is without the second scene.

12. The image acquisition method of claim 11, further comprising:
storing a pre-stored image captured for the transparent entity area when there is no data information displayed on the plurality of image pixels of the transparent entity area.

13. The image acquisition method of claim 12, wherein processing the initial image to obtain the target image comprises:
acquiring in real time an image displayed on the transparent entity area when the plurality of image pixels of the transparent entity area are displaying the data information, wherein the second scene comprises a first sub-scene corresponding to the displayed image and a second sub-scene corresponding to the pre-stored image; and
removing the first sub-scene and the second sub-scene from the initial image to obtain the target image that comprises the first scene and is without the second scene, based on the initial image, the displayed image and the pre-stored image.

14. The image acquisition method of claim 12, wherein processing the initial image to obtain the target image comprises:
acquiring in real time an image displayed on the transparent entity area when there is no data information displayed on the plurality of image pixels of the transparent entity area, wherein the second scene corresponds to the pre-stored image; and
removing the second scene from the initial image to obtain the target image that comprises the first scene and is without the second scene, based on the initial image and the pre-stored image.

15. The image acquisition method of claim 11, before acquiring the initial image comprising the first scene outside the electronic device and the second scene inside the electronic device, further comprising:
controlling a color displayed on the plurality of image pixels of the transparent entity area to cause the transparent entity area to act as a filter.

16. The image acquisition method of claim 11, before acquiring the initial image comprising the first scene outside the electronic device and the second scene inside the electronic device, further comprising:
controlling the transparent entity area to give out white light to cause the transparent entity area to act as a flashlight.

17. A display screen assembly, applied to an electronic device, the electronic device comprising a housing and a camera, the display screen assembly being arranged on the housing to define a receiving chamber cooperatively with the housing, the camera being arranged in the receiving chamber, the display screen assembly comprising:
a transparent entity area, comprising a plurality of image pixels configured to display data information, the transparent entity area being positioned to a location corresponding to a location of the camera in the receiving chamber; and
a non-transparent area, comprising a plurality of image pixels configured to display data information, and surrounding the transparent entity area,
wherein the camera is adapted to receive light passing through the transparent entity area to acquire an initial image comprising a first scene outside the electronic device and a second scene inside the electronic device.

18. The display screen assembly of claim 17 wherein a projection of a center point of the transparent entity area in a direction perpendicular to the display screen assembly is overlapped with a projection of a center point of the camera in a direction perpendicular to the display screen assembly.

19. The display screen assembly of claim 17 wherein a projection of the transparent entity area in a direction perpendicular to the display screen assembly covers a projection of the camera in a direction perpendicular to the display screen assembly.

20. The display screen assembly of claim 17, further comprising:
a display screen; and
a cover, arranged on the display screen,
wherein the display screen comprises a transparent area, a part of the cover corresponding to the transparent area form the transparent entity area together with the transparent area.

* * * * *